United States Patent
Geiger et al.

(10) Patent No.: US 8,477,711 B2
(45) Date of Patent: Jul. 2, 2013

(54) MEDIA ACCESS CONTROL SCHEME FOR A MULTI-FREQUENCY TDMA NETWORK

(75) Inventors: John Andrew Geiger, Rochester, NY (US); Thomas Clayton Mayo, Honeoye Falls, NY (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 12/774,808

(22) Filed: May 6, 2010

(65) Prior Publication Data

US 2011/0134878 A1 Jun. 9, 2011

Related U.S. Application Data

(60) Provisional application No. 61/266,713, filed on Dec. 4, 2009.

(51) Int. Cl.
*H04W 4/00* (2009.01)
(52) U.S. Cl.
USPC .......................... 370/330; 370/229; 370/236
(58) Field of Classification Search
USPC ............. 370/229, 230, 236, 310.2, 328, 329, 370/330
See application file for complete search history.

(56) References Cited

U.S. PATENT DOCUMENTS

| | | | |
|---|---|---|---|
| 6,496,490 B1 | 12/2002 | Andrews | |
| 6,757,550 B1 * | 6/2004 | Yoneyama et al. | 455/525 |
| 6,895,248 B1 | 5/2005 | Akyol et al. | |
| 7,397,818 B2 | 7/2008 | Restivo et al. | |
| 7,460,553 B2 | 12/2008 | Riveiro Insua et al. | |
| 2008/0062944 A1 * | 3/2008 | Smith et al. | 370/342 |
| 2008/0108365 A1 * | 5/2008 | Buddhikot et al. | 455/452.1 |
| 2008/0198801 A1 | 8/2008 | Kesselman et al. | |
| 2008/0219208 A1 * | 9/2008 | Adams et al. | 370/328 |
| 2009/0264142 A1 * | 10/2009 | Sankar et al. | 455/501 |
| 2009/0286563 A1 * | 11/2009 | Ji et al. | 455/501 |
| 2009/0310543 A1 * | 12/2009 | Kim et al. | 370/329 |
| 2010/0248680 A1 * | 9/2010 | Agulnik et al. | 455/404.2 |
| 2012/0213179 A1 * | 8/2012 | Bourlas | 370/329 |

FOREIGN PATENT DOCUMENTS

| | | |
|---|---|---|
| GB | 2302481 A | 1/1997 |
| WO | 2005/015839 A1 | 2/2005 |
| WO | 2009/073744 A2 | 6/2009 |

OTHER PUBLICATIONS

PCT Search Report issued in connection with corresponding WO Patent Application No. US2010/054914 filed on Nov. 1, 2010.
Multi-Frequency Media Access Control for Wireless Sensor Networks. Gang Zhou, Chengdu Huang, Ting Yan, Tian He, John A. Stankovic. Department of Computer Science, University of Virginia, Charlottesville 22903.

\* cited by examiner

*Primary Examiner* — Obaidul Huq
*Assistant Examiner* — Nguyen Ngo
(74) *Attorney, Agent, or Firm* — GE Global Patent Operation; Catherine J. Toppin

(57) ABSTRACT

A system for managing element management in an ad-hoc network is disclosed. The system employs a TDD/FDD communication protocol to allocate assignment of time/frequency slots to individual system elements. Time/frequency assignment is based on desired communication standards in conjunction with geographic mapping of adjacent stations to prevent interference between stations.

10 Claims, 12 Drawing Sheets

MEDIA ACCESS CONTROL SCHEME FOR A MULTI-FREQUENCY TDMA NETWORK

CLAIM OF PRIORITY

This application claims the benefit of the earlier filing date, pursuant to 35 USC 119, to that patent application entitled "A Media Access Control Scheme for a Multi-Frequency TDMA Network," filed on Dec. 4, 2009 and afforded Ser. No. 61/266,713, the contents of which are incorporated by reference, herein.

BACKGROUND OF THE INVENTION

In the management of distributed networks that include mobile terminals, the need for proper management and understanding of the remote terminals is an important factor in preventing interference with one another. Thus, systems are continually being developed to identify remote terminals and their location within a general area and also to determine when the remote terminal has passed from one general area to another. The system for air traffic control managed by the Federal Aviation Administration (FAA) is one such system wherein fixed base stations monitor aircraft traffic and provide instruction to the aircraft and to a next station within the aircraft's flight path when the aircraft passes from one area to a next area. A second base station that operates on a different frequency may manage the next area. Thus, the pilot of the aircraft may be instructed to switch to the frequency of the second base station. Or may know, apriori, the frequency of the next station and may switch to it just prior to leaving the coverage area of a first base station.

However, the FAA system is one that is fairly well regulated and controlled by the FAA, as there are a limited number of base stations and remote terminals within a given coverage area. Typically, as most commercial flights are pre-planned, the air traffic handlers and pilots have a general knowledge of the operating conditions of the aircraft and of the base stations. Thus, the aircraft may move effortlessly through different areas without experiencing signal interference with other aircraft. This spoken protocol between the elements of the air traffic control system satisfies the low bandwidth demands on these communication channels. However this protocol is extremely wasteful when implemented for a high bandwidth machine controlled messaging system.

In a national rail communication network, which has developed over a significantly longer time and generally fails to have central authority to manage the network or to control deployment of new equipment. The number of elements within the train network is significantly larger than that of the air traffic control system. In addition, the amount of data to be transferred and the autonomous nature of the transfer of data among the train network elements require more limited human communication to control the network.

For example, a train network system may include a plurality of wayside transmitters/receivers that monitor and/or control the operation of railroad crossing and bridges in addition to a number of base stations that are separated by a finite distance that monitor and control the wayside transmitters/receivers within a designated area. The wayside transmitters/receivers may be in wireless communication with a corresponding base station and the base stations may be in wireless and/or wired communication with each other.

In addition, a plurality of trains, representing fixed or mobile remote terminals, may enter and leave a base station control area and may be detected by one or more wayside stations. The wayside stations may provide information regarding the location of the detected remote terminal to the base station for management. For example, a base station, after receiving information from a first wayside station may anticipate the arrival of the remote terminal within a known distance of a next wayside station and provide information to the next wayside station to control, for example, a crossing gate or a lighting sequence. The next wayside station may further provide information that the remote terminal is approaching or has passed completely through the wayside station.

In order to operate properly, the devices within the network must be synchronized to avoid interference and/or data collisions, as errors in the control of wayside stations may cause significant damage.

However, as new equipment may be deployed in a train system, for example, wherein the new equipment is added to the network without considering whether the new equipment (devices) is compatible with all previously deployed equipment. Thus, it is possible that a device attached to a remote terminal may enter an area in which the device is not compatible with the wayside station and/or the receiving base station regulating the area.

Hence, because of the vast number of channel users and messaging throughput required of the rail application, there is a need for a system that allows for management of communication among different devices in the rail communication system.

SUMMARY OF THE INVENTION

As described herein, the embodiments of the present invention overcome one or more of the above or other disadvantages known in the art.

One aspect of the present invention relates to a method of determining frequency/time slot communication allocation in a national train network.

Another aspect of the present invention provides for the determination of a base station frequency/time slot allocation considering the frequency/time slot allocations of cooperating base stations.

In another aspect of the present invention discloses a method of determining cooperating base stations in which frequency/time slots allocations are considered.

These and other aspects and advantages of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF PREFERRED EMBODIMENTS OF THE INVENTION

Traditional wireless communication systems, in a national rail communication network, have assigned a fixed channel or number of channels to each base station and listen to one channel at a time on a single channel radio. This access scheme often leaves capacity unused if there is not a uniform demand on each base station.

Figure 1:
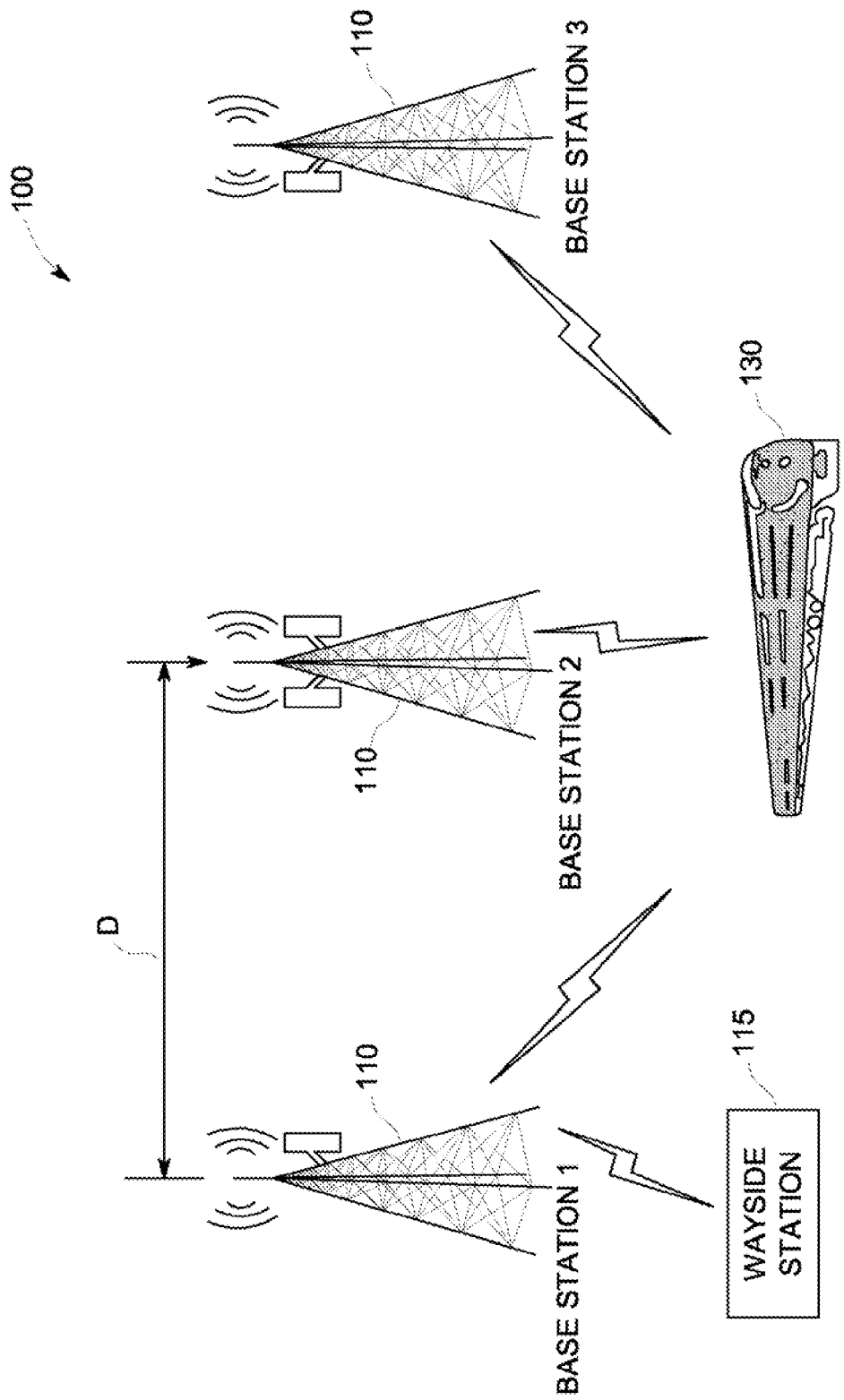
FIG. 1 illustrates a conventional train network system.

In accordance with the principles of the present invention, a communication system is disclosed that utilizes a plurality of Time Division Duplexed (TDD)/Frequency Division Duplexed (FDD) radio channels that may be dynamically allocated using spatial diversity to create a robust link with exceptional bandwidth and frequency reuse assignable among the elements of the network. In the description of the invention presented herein a plurality of frequency channels represent a finite set of N channels labeled FN. Each base station can simultaneously transmit and receive on M channels, wherein M is a subset of the set of FN (M={N} of the set FN). The set of frequency channel can be made up a number of varying bandwidth channels. All of the N channels can be used by one base station simultaneously or shared among multiple base stations System Topology The communication system or network, disclosed herein, is composed of a plurality of base stations spaced a known distance (D) apart. The base stations are connected to a communication server through a network cloud. Each base station in the system may receive the entire set of N receive channels and can transmit on a set of M transmit channels. An individual transmission packet may be received by a plurality of base stations. The packets are sent to the communication server, which removes duplicate packets. FIG. 1 illustrates an exemplary communication network 100 wherein base stations 110 are separated by a known distance (D) that are in communication with each other via a wireless and/or a wired communication link. Wayside stations 115 are also distributed throughout the areas that are controlled by a corresponding base station. In some cases, a wayside station 115 may be within receiving range of one or more base stations. In addition, mobile or locomotive terminals 130 may be distributed within different areas of the network. It would be appreciated that the equipment associated with the mobile or locomotive terminals 130 and/or the wayside stations 115 may be from different manufactures and different times of deployment. Hereinafter, the network element wayside stations 115 and mobile terminals 130 are referred to as remote terminals and, thus, the terms wayside station, mobile terminal and remote terminal are used interchangeably. In addition, the remote terminals may either be fixed or mobile within the network.

Figure 2:
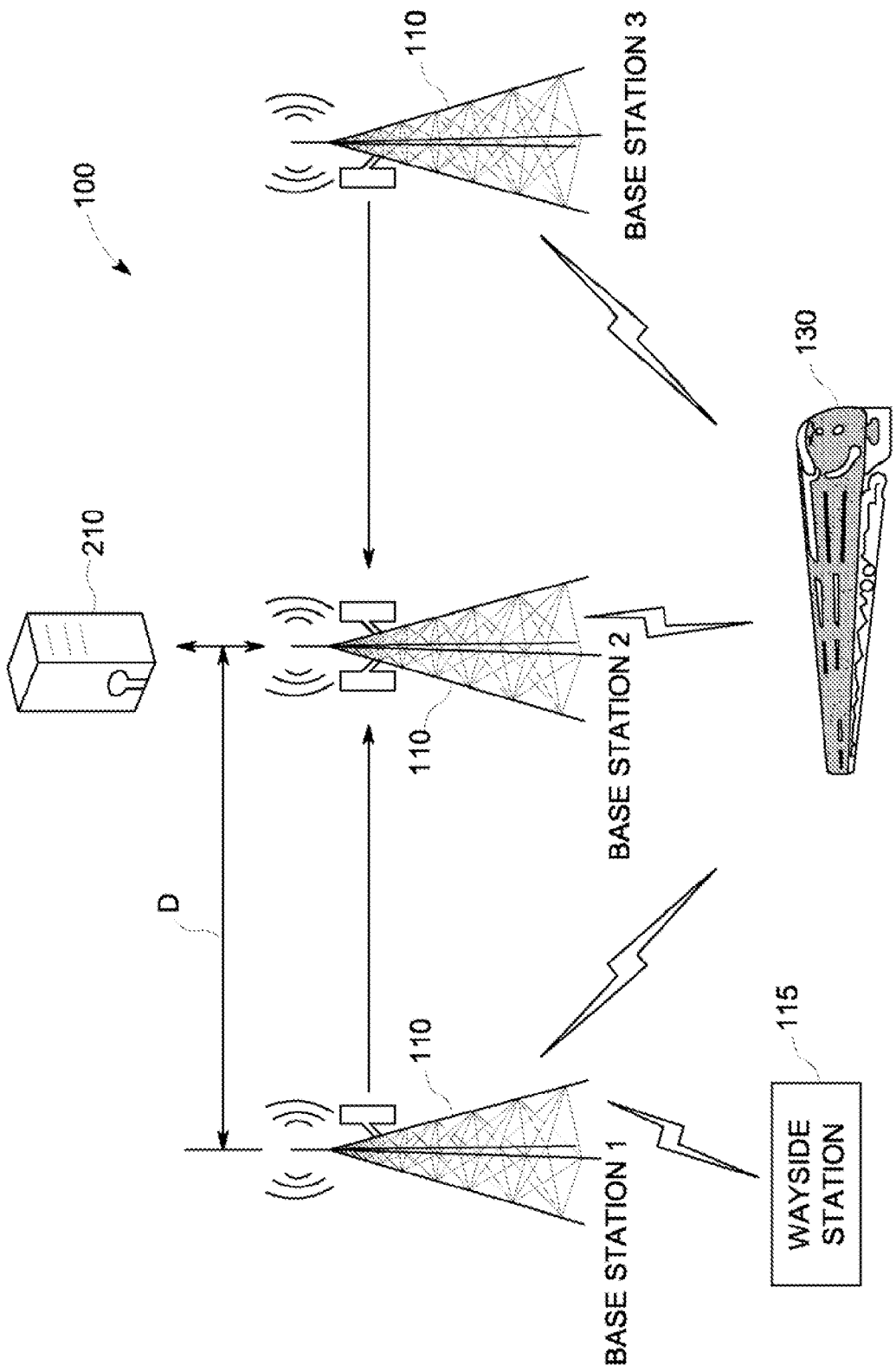
FIG. 2 illustrates a more detailed operation of the conventional train network work shown in FIG. 1.

FIG. 2 illustrates communication of a mobile terminal 130 with a plurality of base stations 110. In this illustrated case, each of the base stations is separated by a known distance, D, from its neighbor. In addition, each of the base stations is in communication with at least one other base station, through a separate communication link, and at least one base station 110 is in communication with a coordination server 210. The coordination server 210 function may alternately reside within one of the base stations 110. The coordination server 210 receives information regarding, for example, a position of a mobile terminal 130 within the network and provides this information to other base stations, and other servers and/or facilities (not shown). As would be appreciated, server 210 may be connected via a public network, e.g., the Internet, or a private network (not shown), to one or more not shown servers or facilities.

Figure 3:
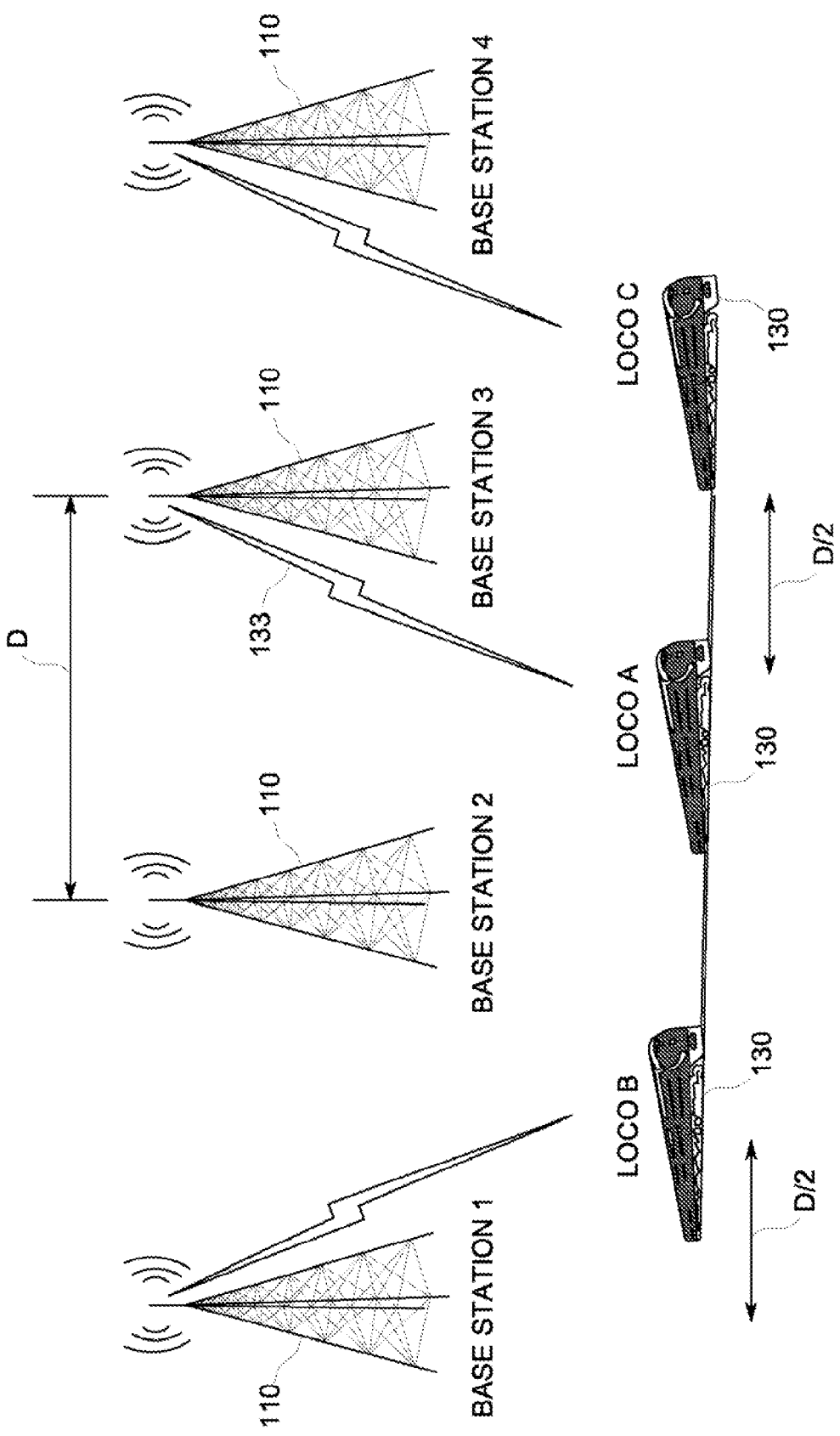
FIG. 3 illustrates an exemplary interoperability of the conventional train network shown in FIG. 1.

FIG. 3 illustrates a communication among a plurality of base stations 110 and a plurality of remote terminals 130. However, in this multi-base station/multi-terminal illustration, the remote terminal 130, must be assigned at least one frequency/channel on which to communicate with a corresponding base station. In one aspect of the invention, the reuse of frequency assignments and the prevention of interference between remote terminal transmissions may be determined either (a) by the base stations 110 having enough separation from other base stations servicing remote terminals that do not interfere due to the separation of the "desired" and "other" remote terminals or (b) by a controlled cooperation of base stations such that frequency and slot assignments are not repeated within a community of cooperating base stations. To accomplish this, a reservation map is maintained that is used to prevent frequency and slot reuse among the cooperating bases. Such coordination of the frequency/slot spectrum may be performed through a reservation (communication allocation) map, as will be discussed in further detail with regard to FIG. 5.A/B In one aspect, the remote terminal 115/130 may be required to determine which of the base stations 110 represents the highest quality signal path for passing communication traffic. For example, remote terminal 130, represented as Loco A, may receive broadcast messages from base stations, represented as base station 2 and base station 3. Loco A receives these broadcast messages from base station 2 and base station 3 within predetermined frequencies/timeslots. Loco A must determine which of these two base stations represents the optimal communication path. The base station selection may be determined based on geographic proximity (distance), signal strength, signal quality, percentage of messages received vs. a known quantity transmitted, and/or a combination of the above and other metrics and already known pre-assigned frequencies. In this case, base station 3, represented by communication link 133, may be selected. Further, the selected base may allocate a frequency/slot combination to Loco A for communication with other elements within the network considering the operating conditions of other, non-moving and moving, wayside stations 115 (not shown) and remote terminals 130 (Loco B, Loco C) as represented by their established frequency and slot assignments in a reservation map. Different free space losses may be exhibited based on the geographic conditions between the base station 110 and the remote terminal 115/130.

Figure 4:
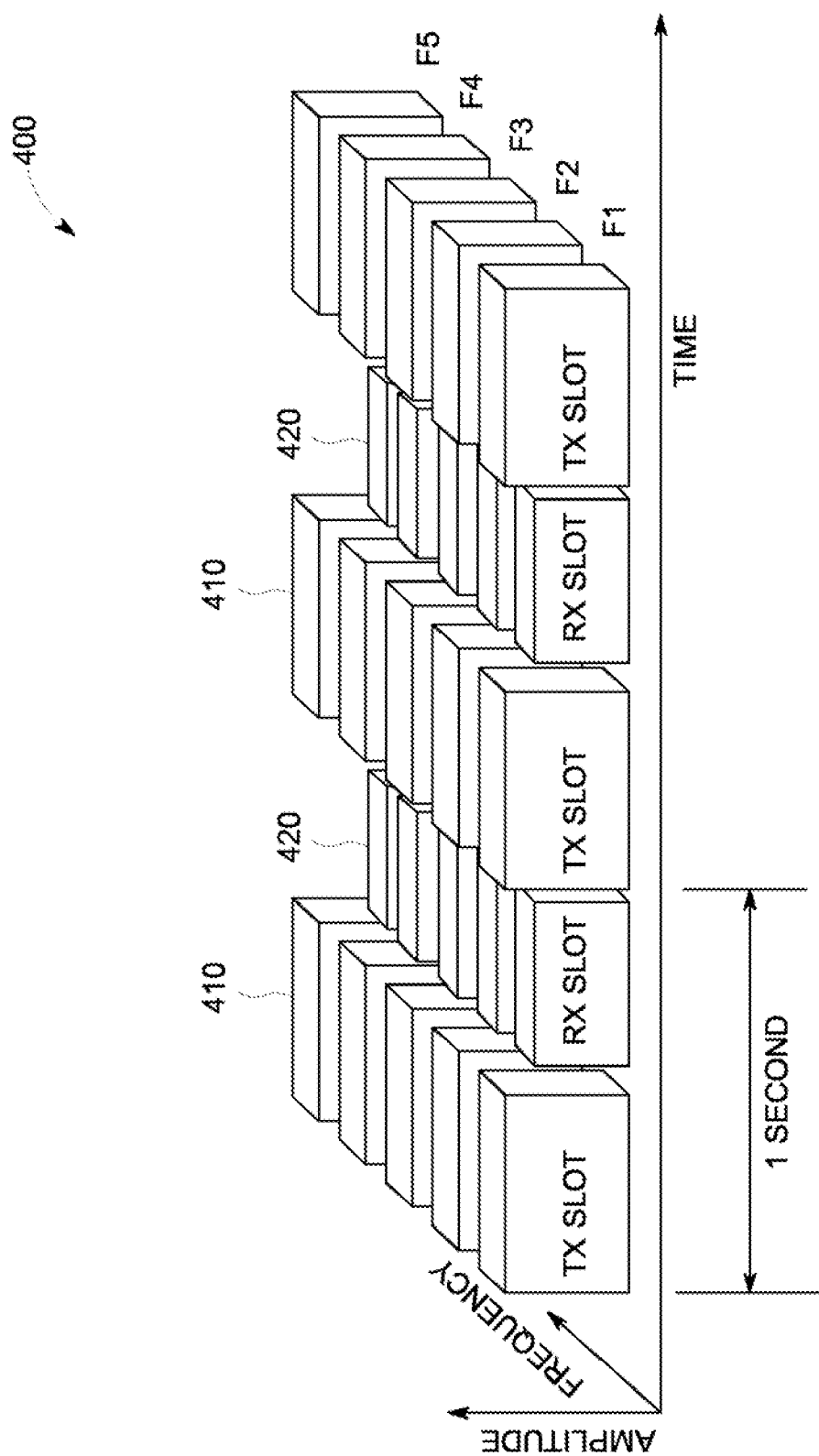
FIG. 4 illustrates a an exemplary time/frequency spectrum in accordance with the principles of the invention.

TDD Structure:

FIG. 4 illustrates an exemplary FDD/TDD structure 400 in accordance with the principles of the invention. The TDD MAC (Media Access Control) frame is split into periodic transmit 410 and receive 420 times. The transmit time is represented as one large packet 410 that consist of a synchronization preamble, packet control data and a data payload, and error correction and detection fields (not shown). The data payload field may be constructed to send data to one or many remote downstream terminals or devices, wherein wayside stations and locomotive terminals are referred as remote terminals or devices. The upstream packets may be constructed as an integer number of data payload units. Each upstream packet consists of a synchronization preamble, packet control data and payload consisting of an integer number of data payload units (not shown).

As an example for PTC (Positive Train Control) a downstream signal having a 550-millisecond transmit frame interval (410) represents a single transmit interval with a single preamble. The upstream data within the remaining 450 milliseconds (assuming a frame of one second) 420 can be divided into integer multiples of 16 byte payload packets that can be shared by multiple users or as one large single user packet. Examples of the number time slots available for a combination of 25 kHz and 50 kHz channels are shown in Tables 1, 2, and 3, wherein Table 3 shows the total availability of time slots and capacity for the exemplary six 25 kHz channels plus four 50 kHz channels.

TABLE 1

| Channel Bandwidth Quantity of Channels | | 25 kHz 6 | |
|---|---|---|---|
| Payload Packet Size (Bytes) | Time Slots per 25 kHz Channel | Capacity per 25 kHz Channel (kbps) | Aggregate Timeslots for all 25 kHz Channels | Aggregate Capacity for all 25 kHz Channels (kbps) |
| 16 | 20 | 2.6 | 120 | 15.4 |
| 32 | 13 | 3.3 | 78 | 20.0 |
| 64 | 8 | 4.1 | 48 | 24.6 |
| 128 | 4 | 4.1 | 24 | 24.6 |
| 256 | 2 | 4.1 | 12 | 24.6 |
| | Bytes | kbps | | kbps |
| Largest Single Packet Size | 585 | 4.7 | | 28.1 |

TABLE 2

| Channel Bandwidth Quantity of Channels | | 50 kHz 4 | |
|---|---|---|---|
| Payload Packet Size (Bytes) | Time Slots per 50 kHz Channel | Capacity per 50 kHz Channel (kbps) | Aggregate Timeslots for all 50 kHz Channels | Aggregate Capacity for all 50 kHz Channels (kbps) |
| 16 | 40 | 5.1 | 160 | 20.5 |
| 32 | 26 | 6.7 | 104 | 26.6 |
| 64 | 16 | 8.2 | 64 | 32.8 |
| 128 | 8 | 8.2 | 32 | 32.8 |
| 256 | 4 | 8.2 | 16 | 32.8 |
| | Bytes | kbps | | kbps |
| Largest Single Packet Size | 1185 | 9.5 | | 37.9 |

TABLE 3

| Channel Bandwidth Quantity of Channels | Total | |
|---|---|---|
| Payload Packet Size (Bytes) | Total Aggregate Timeslots | Total Aggregate Capacity (kbps) |
| 16 | 280 | 35.8 |
| 32 | 182 | 46.6 |
| 64 | 112 | 57.3 |
| 128 | 56 | 57.3 |
| 256 | 28 | 57.3 |
| | | kbps |
| | | 66.0 |

Physical Layer:

The physical layer uses a modulation and FEC (Forward Error Correction Code) scheme that requires a low carrier to interference ratio to satisfy a desired bit error rate (e.g., $1 \times 10^{-3}$ BER). Typically, the modulation is on the order of 3 dB to 6 dB. A low carrier to interference ratio (C/I) allows frequencies to be reused when the ratio of the distance between two users and two base stations is greater a desired criterion as will be described with regard to FIG. 8.

Frequency Planning:

In accordance with the principles of the invention, each base station 110 operates on M transmit frequencies and N receive frequencies where N is greater than or equal to M, and in a preferred embodiment, N is an integer multiple of M. The M transmit frequencies are used simultaneously at each base station. The N receive channels (frequencies) are simultaneously received at every base station 110 using a TDD multiplexing scheme that separates the Transmit and Receive packets (see FIG. 4). The Transmit and Receive packets may be separated by time, as the packets are transmitted at different times within the frame (see FIG. 6, for example).

Each base station is assigned M transmit frequencies, which represent a "Transmit group" associated with the base station. Preferably, N is an integer multiple i of M. If N is not an integer multiple the groups can be defined in groups of i and i+1. That is, the non-multiple groups are divided between two groups.

MAC Services:

The MAC can provide best effort service or reserved slots to send data on a periodic basis. In accordance with the principles of the invention, a reservation map describes the allocation state of each of the uplinks frequencies/time slot reservations. The system has a plurality of priority cues in both the upstream and downstream directions. Messages with the highest priority can be transmitted first or, in one aspect of the invention, a ratio of message traffic may be developed wherein highest priority receive a majority of the bandwidth but in the event the highest priority cue never empties, lower priority cues can be sent with respect to a known ratio of higher priority traffic to lower priority traffic. For example, the processing may be such that high priority messages may be sent ninety percent (90%) of the time while lower priority messages may be sent ten percent (10%).

Reservation Map

Figure 5A:
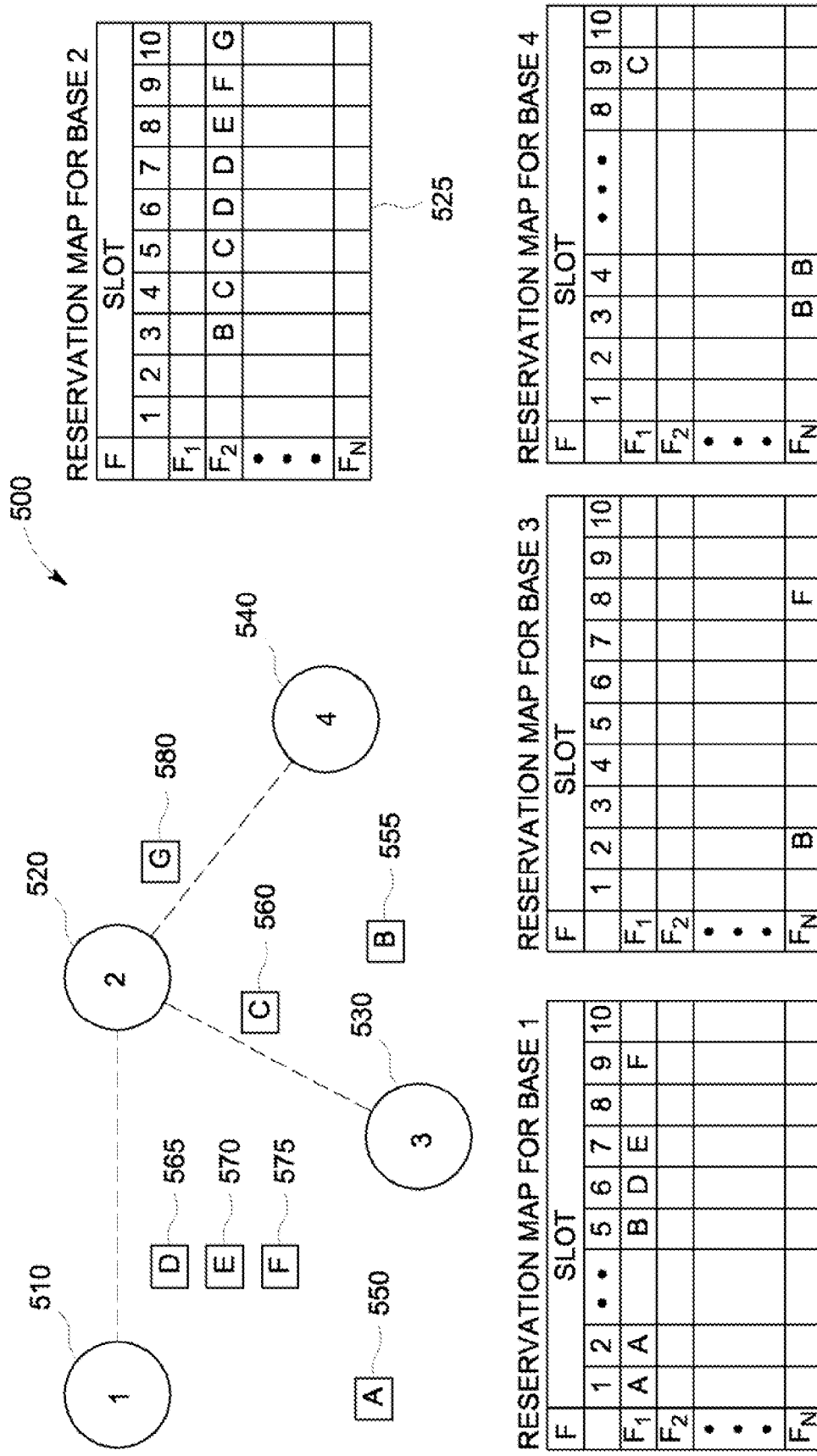
FIGS. 5A and 5B illustrate an exemplary network configuration and time/frequency allocation and cooperative relationships of the network shown.

FIG. 5A illustrates an exemplary network configuration including four base stations, 510, 520, 530, 540, labeled 1, 2, 3, 4, respectively. Also illustrated is a plurality of fixed remote terminals 550, 555, 560, 565, 570, 575 and 580, designated with the letters A-G, respectively, operating in one or more coverage areas of the four base stations. Each of the remote terminals A-G communicates with at least one base station.

Also illustrated are reservation maps 515, 525, 535 and 545 associated with base stations 1, 2, 3 and 4, respectively. The reservation maps 515, 525, 535, 545 represent a bit map where each bit represents a frequency and time segment (communication allocation) and denotes an assignment of frequency/slot number transmission in accordance with the FDD/TDD system shown in FIG. 4. In this illustrated example, base station 1, 510 communicates with at least remote terminals A, D, E and F, as represented by reservation map 515 and base station 3, 530 communicates with remote terminals B and F, as represented by reservation map 525. Reservation map 515 illustrates that remote terminal A 550 utilizes two (2) time slots on frequency F1 while the remaining remote terminals D-F each utilize a single time slot. Map 525 illustrates the frequency/time allocation associated with remote stations B, C, and D communicating with base station 2, 520 and map 545 illustrates the frequency allocation associated with remote terminals B, C and G communicating with base station 4. Reservation map 545 further illustrates that base station 4 communicating on with remote terminal C and G on frequency F1 and with remoter terminal B on frequency FN.

Figure 5B:
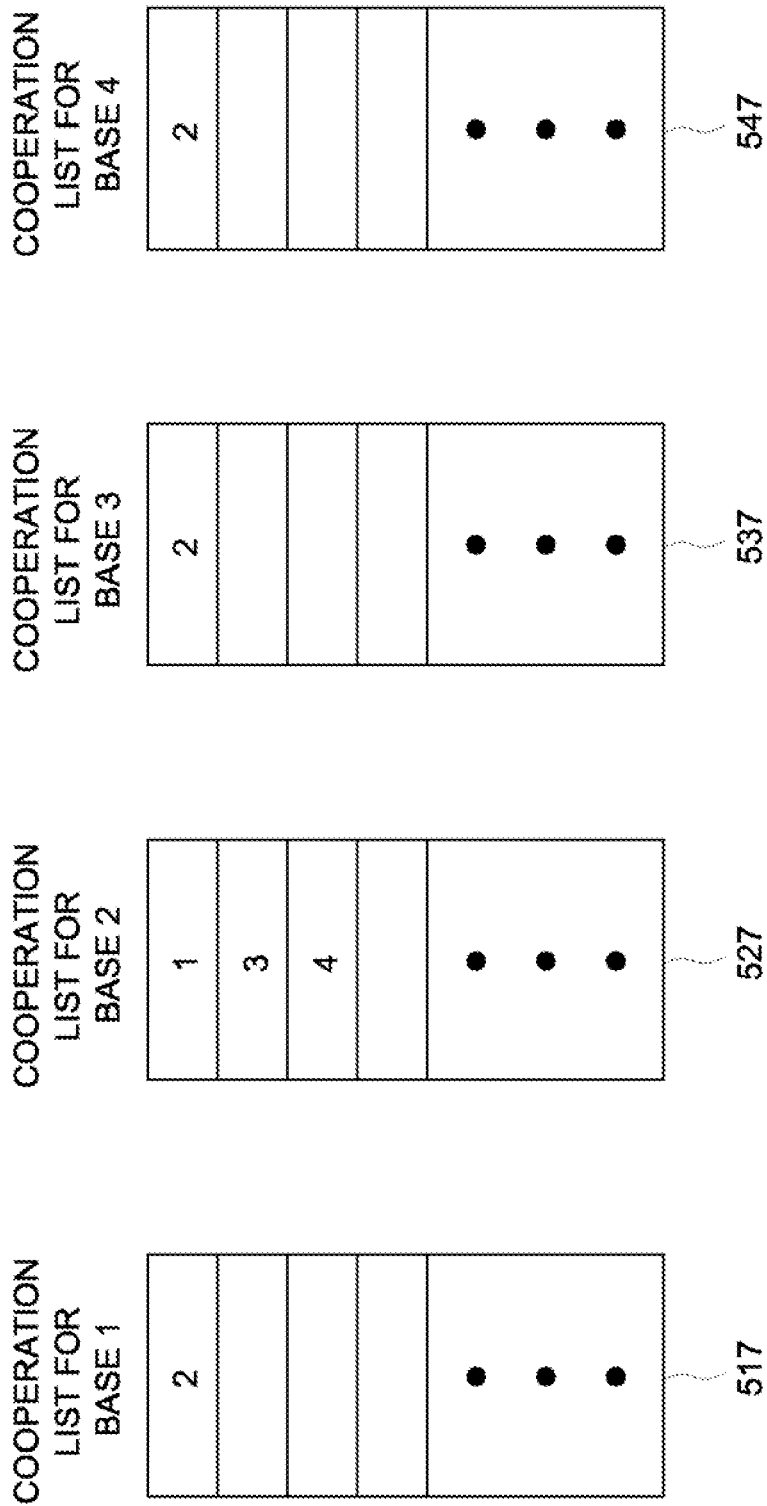

FIG. 5B illustrates exemplary community cooperation lists 517, 527, 537, 547 associated with base stations 510, 520, 530 and 540, respectively. Cooperation lists provide a means for associating base stations to avoid and/or prevent conflicts in assignment of frequency/slots to remote terminals 115/130 that may communicate with one or more base stations. In the illustrated example, base station 1, 510 cooperates with base station 2, 520 to avoid assignment conflict, while base station 2, 520 cooperates with base station 1, 510, base station 3, 530 and base station 4, 540. Similarly, base stations 3, 530 and 4, 540 are each associated or cooperate with base station 2, 520. The cooperation lists are utilized by a base station to determine whether a to-be-assigned frequency/slot is in use by a cooperating base station. The cooperation lists may be determined, in part, based on the relative location of the base stations to each other and the expected signal strength of a remote terminal communicating with the base stations. (see FIG. 7C)

Figure 6:
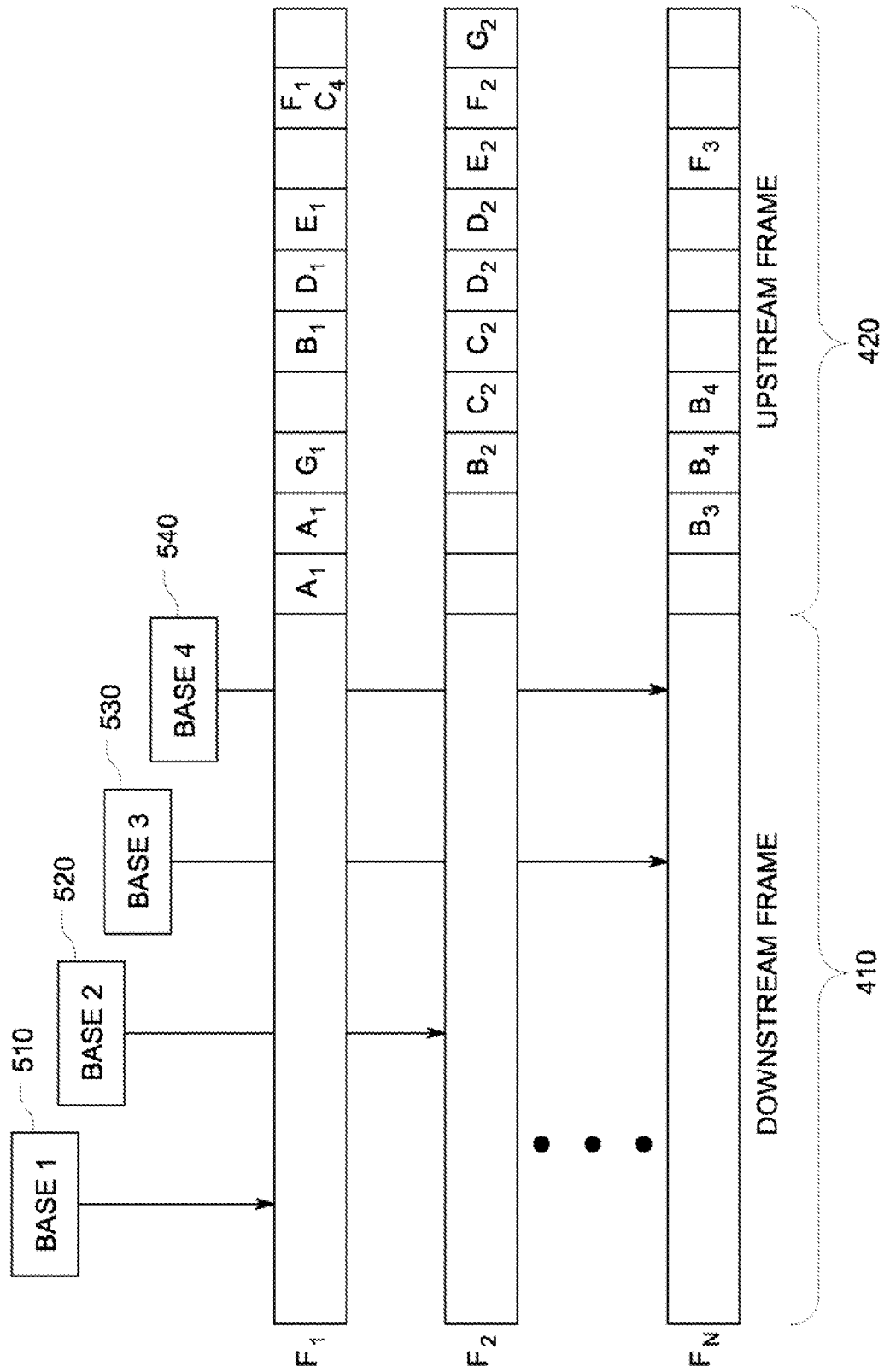
FIG. 6 illustrates an exemplary allocation of remote terminal to frequency/time slots in accordance with the principles of the invention.

FIG. 6 illustrates an exemplary frequency/time slot allocation associated with base stations 1, 2, 3 and 4. In this exemplary frequency/time slot allocation, base station 1, 510 transmits on frequency F1 during the downstream transmission 410 and remote terminal A 550 transmits in the first two slots of the upstream transmission 420. In addition, each of the other remote terminals B 555, D 565, E 570, F 575 and G 580 transmits during a single slot within the upstream transmission. The number of slots allocated to a remote terminal may be determined, in part, on the amount of data to be transmitted, the number of available channels in the upstream and the data rate of the channels. The selection of which slot(s) within the upstream transmission may be determined as will be described with regard to FIGS. 7A-7D.

Similarly, base station 2, 520 transmits on frequency F2 and base station 3, 530 transmits on frequency Fn during the downlink period 410, while each of remote terminals B-G 555, 560, 565, 570, 5750, 580 transmits on frequency F2 during an assigned slot within upstream period 420 and remote terminals B and F transmit on frequency FN during the upstream period 420.

Further illustrated is base station 3, 530 transmitting on frequency Fn during the downstream interval 410 and receiving transmissions from remote terminals B (denoted as $B_3$) and F (denoted as $F_3$). Base station 4, 540, furthermore transmits on frequencies F1 and FN during the downstream interval 410 and receives transmissions from remote terminal C on frequency F1 (denoted as $C_4$) and remote terminal B on frequency FN (denoted as $B_4$). In this case, bases station 1, 510 and base station 4, 540 are able to share or reuse the same frequency/time slot allocation as base station 1, 510 and base station 4, 540 are non-cooperating base stations and the transmission interference with remote terminal to/from these base stations is minimal.

Thus, while it is not shown, it would be recognized that each of the base stations may transmit on one or more frequencies and that the corresponding remote terminals may transmit in the upstream period on a corresponding frequency and during an assigned duration of at least one slot period. For example, returning to FIG. 5A, remote terminal D 565 may also operate on frequency FN in time slot 6, for example. In this case, reservation map 515 would include a reference to operation of remote terminal D 565 at this second frequency (FN) and time slot.

While the present discussion has been made with regard to mobile terminals 130 and wayside stations 115, it would be recognized that the mobile terminals and wayside stations represent remote terminals to the base station and, thus, whether the remote terminal is moving or is fixed, its assignment of frequency and slot number(s) in one aspect of the invention may be determined in an a priori manner considering potential interference among the base station, wayside and remote terminals or may be determined dynamically in response to varying conditions, both with regard to the mobility of the remote terminals and the environmental conditions.

In accordance with the principles of the invention, the base station 110 will transmit a reservation map describing the state of each of the uplink time slots on each frequency for a next predetermined number of time units (e.g., seconds) for each cooperating base station. Thus, base station 110, for example, receives the reservation map of base station 2, 520 (see cooperation list 517). Similarly, base station 2, 520 receives the reservation map of base station 1, 510, base station 3, 530 and base station 4, 540 (see cooperation list 527). Thus, when a remote terminal 115/130 requests a frequency/time slot allocation, base station 1, 510 examines its own allocation map 515 and that of cooperating base station 2, 520. Similarly, base station 2, 520 examines its own allocation map 525 and those of cooperating base station 1, 510, base station 3, 530 and base station 4, 540.

Reservation of a time slot/frequency allocation may be made on a periodic basis. For example, frequency/time slot reservation may be performed on a known time basis, e.g. 1, 2 or 3 second. In this case, the bases will transmit that the given slots are busy only during the known time basis requested, i.e. the map broadcast over the air can change from time basis to time basis even if slot allocations over a multi-second epoch are static. This is accomplished in that the bases maintain different allocation maps for each second in the multi-second epoch.

The reservation map of cooperating base stations may be transmitted on one or more frequencies to provide associated base stations with current allocations of the frequency/time slot allocation of uplink channels during at last one next time slot. Larger data channels can be used and will require a larger map, as there are more uplink slots per frequency per second.

Although FIG. 5A illustrates each base station 110 maintaining its own reservation map, in another aspect of the invention, the reservation maps may be maintained in a single server (e.g., server 210, see FIG. 2). Each base station may provide frequency/time slot information to server 210, which may accumulate and collate the provided data. The reservation map for a base station may then be provided to cooperating base stations on the base station's cooperation list, on a periodic basis.

Figure 7A:
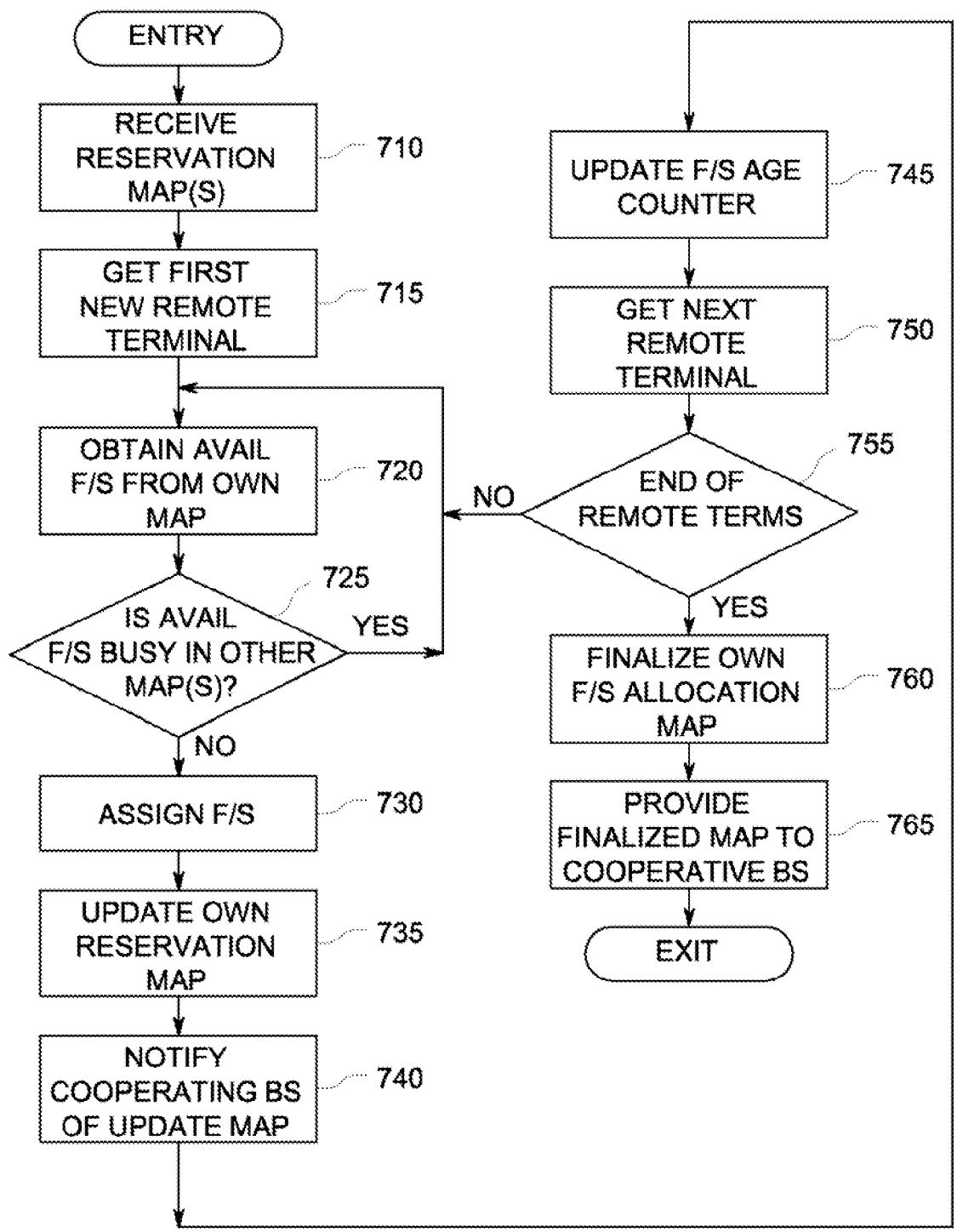
FIGS. 7A-7D illustrate flow charts of exemplary processes for assigning frequency/time slots in accordance with the principles of the invention.

FIGS. 7A-7D illustrate flowcharts of exemplary processes for determining frequency/slot allocation in accordance with the principles of the invention. Referring to FIG. 7A, which illustrates the processing for initializing a frequency/time slot allocation of remote terminals associated with a base station, a base station receives reservations map(s) associated with cooperating base stations in step 710. The reservation maps associated with cooperating base stations represent the frequency/time slot allocations of the corresponding cooperating base stations. At block 715, a first remote terminal is obtained. At block 720 an available frequency/time slot is obtained based on the reservation map of the base station. At block 725 a determination is made whether the obtained available frequency/time slot is indicated to be busy in any one of the received reservation maps of cooperating base stations. If the frequency/time is indicated to be busy or in use, then a next frequency/time slot is obtained at block 720.

Otherwise, the frequency/time slot is assigned to the remote terminal at block 730. The base station's reservation map is updated to indicate that the frequency/time slot is now allocated (busy) at block 735. At block 740, the cooperating base stations are notified of the updated reservation map. At block 745 an age counter associated with the assigned frequency/time slot is set. The age counter allows for a limited time period that the frequency/time slot is in use before re-evaluating the need to maintain the frequency/time slot.

At block 750 a next remote terminal is selected and at block 755 a determination is made whether all the remote terminals have been accessed. If the answer is negative then processing continues at block 720.

Otherwise, the base station reservation map is finalized at block 760 and the finalized reservation is provided to each of the cooperating base stations.

Figure 7B:
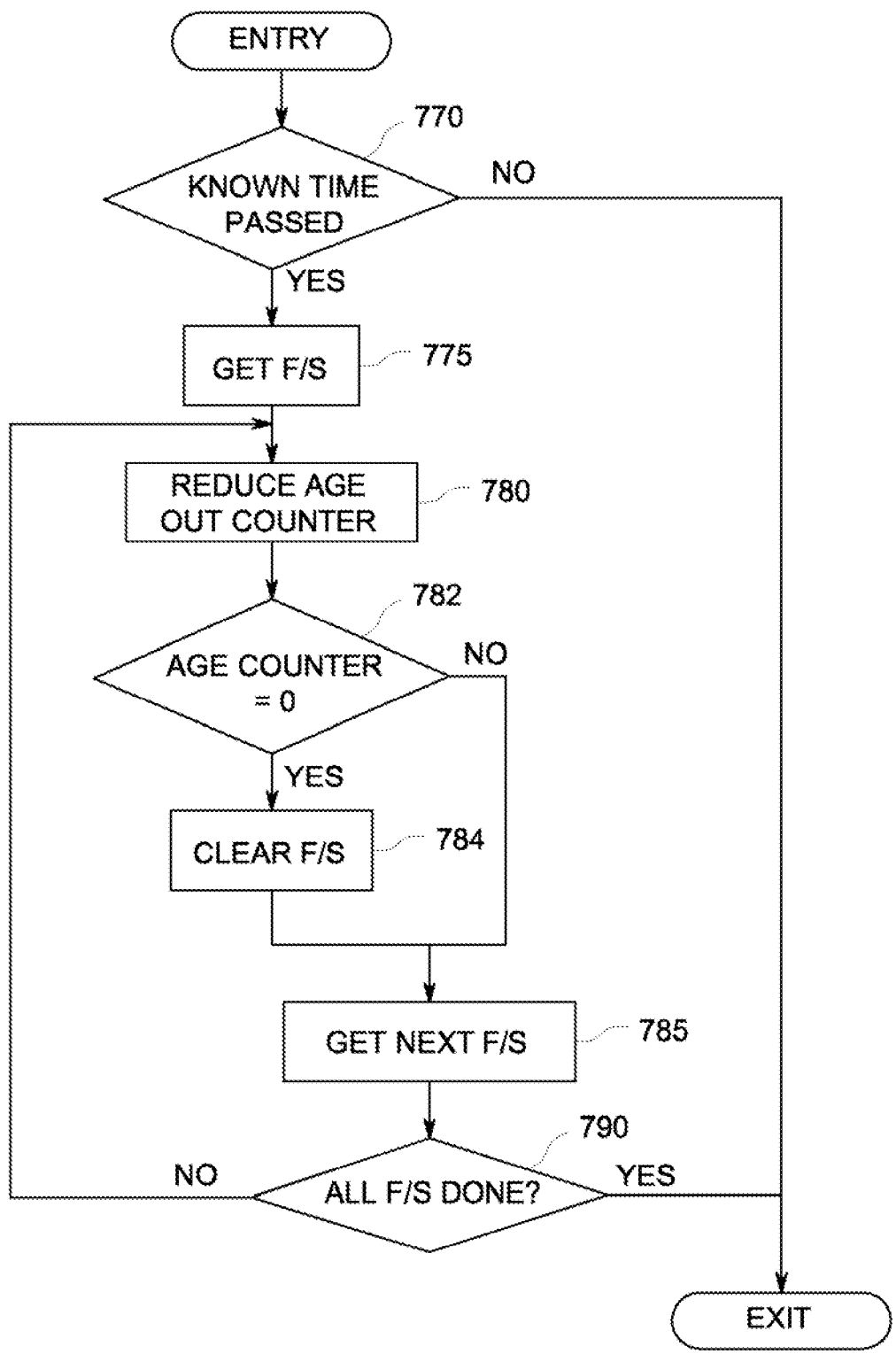

FIG. 7B illustrates a process for determining whether the assigned frequency/time slot allocation is needed; wherein at block 770 a determination is made whether a known time has expired. If the answer is negative, then processing exists.

However, if the answer is in the affirmative, then a frequency/time slot is obtained from the reservation map at block 775. At block 780, the age counter associated with the frequency/time slot is reduced by a known amount. At block 782 a determination is made whether the age counter has expired. If the answer is in the affirmative, then the frequency/time slot is cleared (i.e., marked as not-busy). Otherwise, processing continues to block 785 where a next frequency/time slot is obtained. At block 790 a determination is made whether all the frequency/time slots in the reservation have been processed. If the answer is negative, then processing continues at block 780. Otherwise processing is completed.

In this illustrative process, each frequency/time slot, which may be associated with an individually assigned age counter, is periodically tested to determine whether the frequency/time slot is still necessary. As would be appreciated, if all the frequency/time slots are aged concurrently, then new frequency/time slot allocations may be obtained by performing the processing shown in FIG. 7A.

Figure 7C:
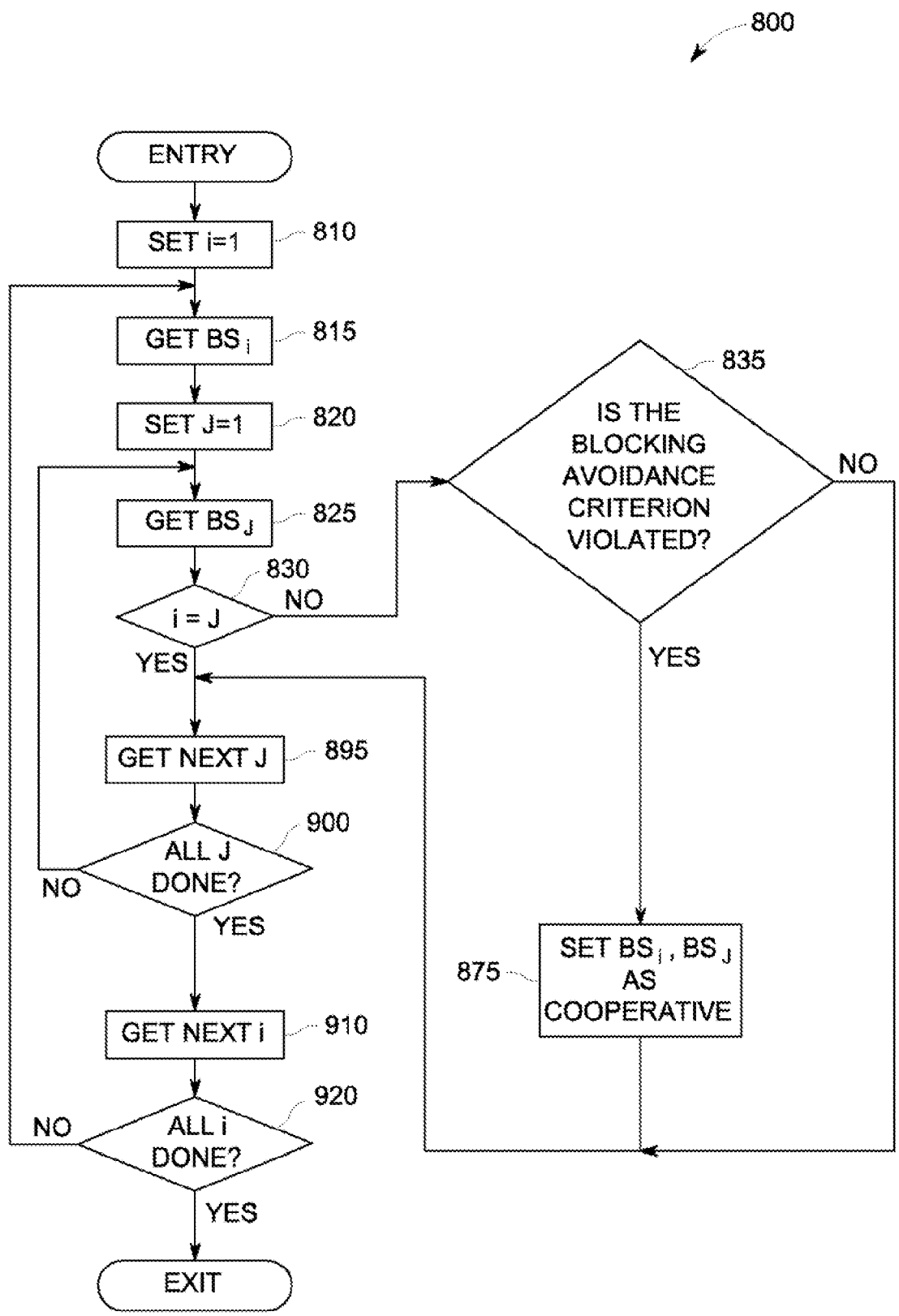

FIG. 7C illustrates an exemplary process for determining cooperating base stations in accordance with the principles of the invention. In this exemplary process, an index, i, is initialized at block 810. At block 815, a base station ($BS_i$) is obtained. At block 820 a second index, j, is initialized and at block 825 a base station ($BS_j$) is obtained. At block 830 a determination is made whether the obtained base stations are the same and if so a next second index j is obtained at block 895 and if all the base stations have been processed, then processing continues at block 825.

Figure 8A:
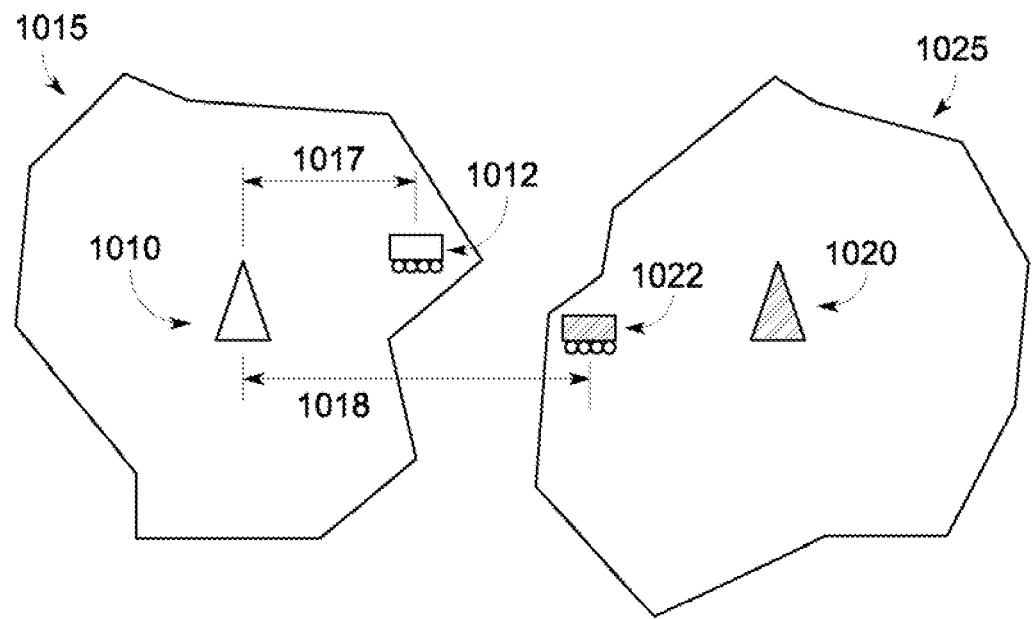
FIGS. 8A and 8B illustrate an exemplary blocking avoidance criterion in accordance with the principles of the invention.

At block 835, a determination is made whether a blocking avoidance criterion is satisfied. As described in more detail below, an exemplary blocking avoidance criterion is illustrated in FIGS. 8A (no blocking) and 8B (blocking). Considering the areas of reliable base/remote radio coverage (1015 and 1025) for base BSi (1010) and base BSj (1020) respectively, is the following mathematical expression satisfied: $Diimax/Djimin > 10^{((C/I)/K)}$, where Diimax is the maximum distance between any remote (1012) that could be associated with base BSi and base BSi (1017), Djimin is the minimum distance between any remote (1022) that could be associated with base BSj and base BSi (1018), (C/I) is the carrier to interference ratio achievable by the radio receiver at base BSi, and K is an environmental constant representing the drop off in radio frequency signal strength vs. distance? If the answer is in the affirmative, then remotes associated with base BSi are assumed to be free from blocking by remotes associated with base BSj.

However, if the answer is negative, then there is the potential for blocking between remotes associated with $BS_j$ and remotes associated with BSi, and thus, $BS_i$ and $BS_j$ must have a cooperative relationship. An indication of this relationship is made in the cooperation lists of both $BS_i$ and $BS_j$. Processing then continues as before at block 895 to check the next base station (j).

Figure 8B:
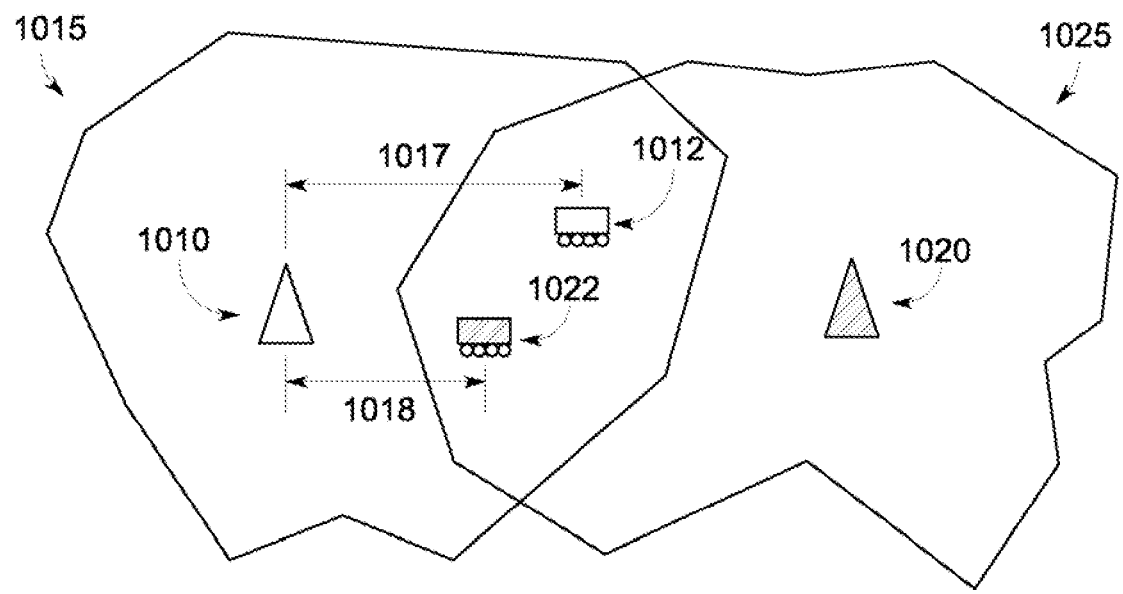

Referring to the network configuration of FIG. 5A, base station 4, 540 cooperates with base station 2, 520 because there is the potential for blocking between transmissions of remotes associated with these two bases, as shown in FIG. 8B. However, base station 4 is not in a cooperating relationship with base station 1, 510, for example, because (as in FIG. 8A) there is no area in which blocking between remotes associated with the two bases would occur.

Figure 7D:
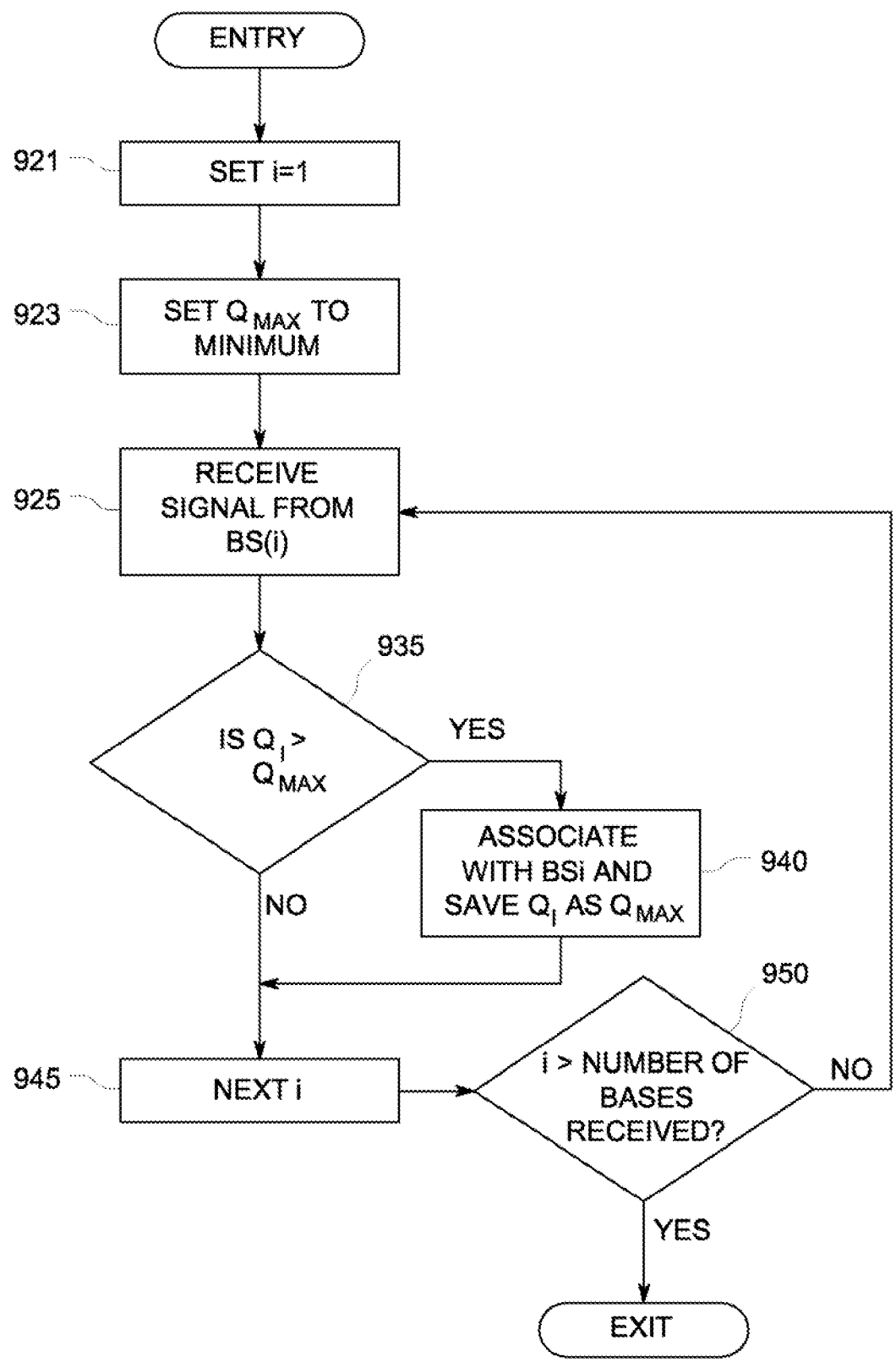

Referring to FIG. 7D, one exemplary process for registering a remote terminal communication device with a base station is shown. The remote terminal communication devices, as shown at 925, simultaneously listen to all of the frequencies F1 through FN during the downstream time period and determines a signal quality at 925 and saves, as shown at 940, the base station that has the best or maximum signal quality. This quality measurement may be determined using a Received Signal Strength Indication (RSSI), a Signal-to-Noise Ratio (SNR), or a percentage of expected messages received (RX %). One exemplary process for determining a maximum signal quality for signals received from a plurality of base stations (i) is shown in FIG. 7D. At 921 and 923, i and $Q_{MAX}$ are initialized and at 925, a signal quality (i) is received from the base station (i). A comparison of the signal quality (i) with the $Q_{MAX}$ is determined at 935 and if quality (i) is greater than $Q_{MAX}$ it is saved at 940. The process continues for each base station (i) at 945 until all base stations within communication distance of the remote device have been reviewed. It will be noted that where only one base station is within communication distance, that base station will have the maximum signal quality. Once the maximum signal quality is determined, the remote terminal examines the reservation map on the frequency having the maximum signal quality and requests a desired number of time slots and thereby registering the remote terminal to that base station. If the base station with the best signal quality changes, the remote terminal changes its base selection, such as shown at 940, and re-establishes a time slot allocation on an as-needed basis in a manner similar to that shown in FIG. 7A.

Thereafter, all transmissions to the remote device may be made from the base station to which the remote is registered. As discussed previously, the reservation map for the base station transmitter may be kept locally (within the base station) or remotely from the base station. In one aspect, the reservation map may be contained in a system server (210, FIG. 2) and is based on the registration of all of the remote sites. In one aspect of the invention, a base station will further block allocation of slots on a frequency associated with adjacent base stations (or a defined group of base stations). This blocking is advantageous as it reduces potential interfering signals among base stations.

FIG. 8B illustrates an example of a determination of interference between two remote terminals 1012 and 1022 in communication with a single base station 1010. In this illustrated example, assuming that a frequency/slot allocation is reserved for one of the two terminals, the allocation of a frequency/slot to the second remote terminal is made to avoid interference between the two remote terminals. For example, assuming in one aspect of the invention, that two frequencies (i.e. N=2) may be allocated among the base stations 1010 and 1020, each remote terminal 1012 and 1022 may be allocated its own frequency. However, in order to re-use the available frequencies, to minimize the number of frequencies that need be maintained, then the two remote terminals 1012 and 1022 may be allocated the same frequency/time slot if the interference between the transmissions of the two terminals 1012 and 1022 satisfies the known criteria as in FIG. 8A.

Referring to FIG. 8A, a frequency may be reused (i.e. assigned concurrently at two remote terminals) if the following criterion is satisfied:

$$Dii\max/Dij\min > 10^{(C/I)/K}$$

wherein Diimax represents the maximum distance from the first base station (1010) to any remote terminal (1012) associated with the first base (1010), Dijmin represents the minimum distance from the first base station (1010) to a remote terminal (1022) associated with the second base (1020);

C/I represents a desired Carrier to Interference ratio; and

K represents an RF propagation constant.

In one aspect of the invention, the interference criteria may consider the geographic topology surrounding the base station 1010 and, hence, the RF propagation constant (i.e., free space path loss), (K), may be altered accordingly. In conceptual embodiments of the invention, the free space loss constant (K) may be represented as being one of 20, 35 and 40 db. As would be appreciated, the free-space path loss value (K) may be selected based on the specific environment and may be determined by measurement or by calculation within the environment. Furthermore, the Carrier-to-Interference ratio (C/I) may vary depending on the radio receiver and modem performance characteristics.

Spatial Redundancy:

In one aspect of the invention, all base stations employ a wide band receiving system to listen to all N uplink frequencies during all upstream time slots. All packets are forwarded to the system server or the addressed base station dependent on packet addressing. This creates spatial redundancy, and simplifies system handoff in a mobile system.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer may transform the general purpose computer into a special purpose computer that may, in part, be dedicated to the processing shown herein.

While there has been shown, described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all any combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A base system comprising:
a transceiving system for receiving information from, and transmitting information to, at least one other base station and a plurality of remote devices; and
an apparatus in communication with the transceiving system and configured for determining a communication allocation to select ones of the plurality of remote devices, the apparatus comprising:
a processor in communication with a memory, the memory including code which when accessed by the processor causes the processor to:
obtain an available communication allocation from a reservation map of communication allocations associated with the base station, wherein the communication allocation comprises allocation of at least one frequency and at least one associated time slot;
receive a communication allocation mapping of each of the least one other base stations operating in cooperation with the base station;
determine a suitability of the obtained available communication allocation in view of communication allocations among the received communication allocation mappings;
provide an indication within the reservation map for indicating an assignment of the available communication allocation when the obtained available communication is determined to be suitable; and
provide an updated reservation map to each of the cooperating base stations; and
wherein a determination to register one of the plurality of the remote devices for receiving information from the base station is carried out at the remote device.

2. The base station of claim 1, wherein suitability is determined when the obtained available communication allocation is available in each of the received allocation mapping.

3. The base station of claim 1, wherein the reservation mapping comprises at least one frequency and one time slot allocation associated with the base station.

4. The base station of claim 1, wherein the processor further maintains a list of cooperating base stations from among the plurality of base stations.

5. The base station of claim 4, wherein the base stations contained within the list of cooperation base stations are determined based on at least one of: the relative locations of potential remote terminals and the expected radio propagation from the potential remote terminals.

6. The base station of claim 1, wherein the processor associated an age counter for each of the assigned available communication allocations, the age counter expiring after a predetermined period of time.

7. A network system comprising a plurality of base stations as set forth in claim 1 and further comprising at least one remote terminal, the at least one remote terminal comprising:
    a transceiving system for receiving information from, and transmitting information to, at least one base station and a plurality of other remote terminals; and
    an apparatus, in communication with the transceiving system and configured for selecting one of the plurality of base stations for registration therewith, the apparatus comprising:
        a processor in communication with a memory, the memory including code which when accessed by the processor causes the processor to:
            determine a signal quality of each of the plurality of base stations based upon at least one of a received signal strength, a percentage of expected messages received, and a signal to noise ratio;
            determine a maximum signal quality from the signal qualities of each of the plurality of base stations;
            register the remote terminal with, and request a communication allocation mapping from, the base station having the maximum signal quality.

8. The network system of claim 7, wherein the communication allocation mapping comprises at least one frequency and one time slot allocation.

9. A method for determining a communication allocation among a plurality of base stations and remote terminals, the method comprising:
    receiving communication allocation information from cooperating ones of the plurality
    obtaining an available communication allocation from a reservation map of communication allocations, wherein the communication allocation comprises allocation of at least one frequency and at least one associated time slot,
    determining a suitability of the obtained available communication allocation in view of the received communication allocation information;
    providing an indication in the reservation map indicating an assignment of the obtained available communication allocation when the obtained available communication is determined to be suitable;
    providing an updated reservation map to each of the cooperating base stations; and
    identifying a selected one of the base stations for registering a remote terminal and transferring information to the remote terminal via a decision carried out at the remote terminal.

10. The method of claim 9, wherein suitability is determined when the obtained available communication allocation is available in each of the received allocations.

\* \* \* \* \*